United States Patent
Mizutani

(10) Patent No.: US 6,636,233 B1
(45) Date of Patent: Oct. 21, 2003

(54) APPARATUS FOR PROCESSING TWO-DIMENSIONAL IMAGES AND METHOD OF DOING THE SAME

(75) Inventor: Kenichi Mizutani, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/505,776

(22) Filed: Feb. 17, 2000

(30) Foreign Application Priority Data

Feb. 18, 1999 (JP) .......................................... 11-040193

(51) Int. Cl.7 ................................................. G09G 5/00
(52) U.S. Cl. ........................ 345/637; 345/629; 345/634
(58) Field of Search ................................. 345/629, 634, 345/636, 637, 639, 640

(56) References Cited

U.S. PATENT DOCUMENTS

| 5,412,399 | A | * | 5/1995 | Hara | .......................... 345/637 |
| 5,867,166 | A | * | 2/1999 | Myhrvold et al. | .......... 345/419 |
| 6,016,150 | A | * | 1/2000 | Lengyel et al. | ............. 345/426 |
| 6,330,002 | B1 | * | 12/2001 | Yamada | ...................... 345/629 |

FOREIGN PATENT DOCUMENTS

| EP | 0 806 756 A2 | 11/1997 |
| JP | 63-273894 | 11/1988 |
| JP | 63-316891 | 12/1988 |
| JP | 64-76092 | 3/1989 |
| JP | 2-96220 | 4/1990 |
| JP | 3-253892 | 11/1991 |
| JP | 4-140792 | 5/1992 |
| JP | 5-27745 | 2/1993 |
| JP | 5-225328 | 9/1993 |
| JP | 6-180574 | 6/1994 |
| JP | 9-330422 | 12/1997 |
| JP | 10-214337 | 8/1998 |
| JP | 11-15463 | 1/1999 |

* cited by examiner

Primary Examiner—Matthew Luu
(74) Attorney, Agent, or Firm—McGinn & Gibb, PLLC

(57) ABSTRACT

There is provided an apparatus for displaying two-dimensional image by synthesizing a background and a graphic to each other in translucence, including (a) graphic buffers by the number equal to the number of backgrounds to be displayed, (b) a single display buffer, (c) a first processor which identifies a background on which a graphic is to be displayed, and stores a graphic number of the graphic into a graphic buffer associated with the thus identified background, and (d) a second processor which processes both background data and graphic data associated with each of the backgrounds in translucence in an order where a deeper background as viewed from a display screen is earlier processed, and stores resultant RGB data into a display buffer. The apparatus makes it possible to process all images in translucence without increasing the number of display buffers.

19 Claims, 15 Drawing Sheets

FIG.6
PRIOR ART

| | | |
|---|---|---|
| S10 | COLOR CODE | TRANSLUCENCE VALUE |

| | | | |
|---|---|---|---|
| S11 | COLOR CODE | TRANSLUCENCE VALUE | BACKGROUND OR GRAPHIC DATA |

BACKGROUND DATA STORED IN DISPLAY BUFFER  | COLOR CODE | TRANSLUCENCE VALUE |

GRAPHICS DATA STORED IN DISPLAY BUFFER | COLOR CODE | TRANSLUCENCE VALUE | BACKGROUND OR GRAPHIC DATA |

FIG.11

| ADDRESSES TO PARAMETER RAM | ADDRESSES TO CHARACTER ROM | X COORDINATES | Y COORDINATES | BACKGROUND NUMBER | TRANSLUCENCE VALUE |
|---|---|---|---|---|---|
| O (h) | R0 (h) | X0 (h) | Y0 (h) | M0 (h) | H0 (h) |
| ... | ... | ... | ... | ... | ... |
| SP1 (h) | R1 (h) | X1 (h) | Y1 (h) | M1 (h) | H1 (h) |
| SP2 (h) | R2 (h) | X2 (h) | Y2 (h) | M2 (h) | H2 (h) |
| ... | ... | ... | ... | ... | ... |

FIG.15

| S10 | COLOR CODE | TRANSLUCENCE VALUE | |
|---|---|---|---|
| S11 | COLOR CODE | TRANSLUCENCE VALUE | |
| DATA STORED IN DISPLAY BUFFER | R | G | B |

APPARATUS FOR PROCESSING TWO-DIMENSIONAL IMAGES AND METHOD OF DOING THE SAME

BACKGROUND OF THE INVENTION

1. Field of the Invention

The invention relates to an apparatus and a method of synthesizing a background and a graphic in translucence to thereby two-dimensionally display resultant image.

2. Description of the Related Art

When an object is seen through a colored glass or sea, the object is seen as if the object has a color of the glass or sea. It is called translucent-processing to make images of an object to be obtained when the object is seen through translucent medium such as a colored glass.

FIG. 1 illustrates an image obtained by carrying out translucent-processing. Though the illustrated image is a two-dimensional one, the image is displayed in three-dimensional axes for the sake of explanation.

The image consists of background images SC1, SC2 and SC3 and graphic images SP1, SP2 and SP3. Herein, the graphic images SC1, SC2 and SP1 have a color to be translucent-processed. The background and graphic images SC3, SP3, SC2, SP2, SP1 and SC1 are overlapped one another in this order from a bottom to a top, to thereby form the image.

FIG. 2 is a block diagram of a conventional two-dimensional graphic engine.

The illustrated two-dimensional graphic engine is comprised of a central processing unit (CPU) 1, a two-dimensional (2D) graphics processor 2, a character ROM 3, and a display device 4.

The 2D graphics processor 2 includes a CPU interface 5, a ROM interface 6, a background painter 7, a graphic painter 8, a color synthesizer 9, and a controller 10. The above-mentioned background images SC1, SC2 and SC3 are made by the background painter 7, and the graphic images SC1, SC2 and SP1 are made by the graphic painter 8.

The character ROM 3 stores data about images to be displayed in the display device 4. The stored data is mapped in the character ROM 3 in such a manner as illustrated in FIG. 10.

As mentioned below, since the color synthesizer 9 includes a pallet RAM 20, a pallet code, that is, an address for the pallet RAM 20, is stored in the character ROM 3 pixel by pixel. Signals S3 indicative of address data of the character ROM 3 are transmitted between the character ROM 3 and the ROM interface 6.

The display device 4 is comprised of a cathode ray tube (CRT) or a liquid crystal display (LCD), for instance, and displays images thereon. The display device 4 receives signals S4 indicative of RGB data from the color synthesizer 9, and also receives synchronization signals S17 such as $V_{SYNC}$ and $H_{SYNC}$, from the controller 10.

The CPU interface 5 receives signals S2 from CPU 1, indicating where a graphic is to be displayed on a display screen of the display device 4, and specification of the 2D graphic engine.

The ROM interface 6 adjusts a timing at which the 2D graphics processor 2 provides an address to the character ROM 3 to thereby gain data from the character ROM 3.

The background painter 7 processes backgrounds, that is, adheres data stored in the character ROM 3, entirely on a screen of the display device 4. The background painter 7 receives signals S5 from the CPU interface 5, indicating that which data among data stored in the character ROM 3 is to be displayed on a screen of the display device 4.

The graphic painter 8 makes a graphic of 16×16 dot, for instance, in the character ROM 3, and transmits a signal S7 to the CPU interface 5, indicating that on which coordinate system the thus made graphic is to be displayed in the display device 4. A coordinate system which the graphic painter 8 recognizes has to be greater than a display screen of the display device 4. If a coordinate system which does not exist in the display screen is indicated, a designated graphic cannot be displayed.

The signal S2 transmitted between CPU 1 and the CPU interface 5, the signal S3 transmitted between the character ROM 3 and the ROM interface 6, the signal S4 transmitted between the display device 4 and the color synthesizer 9, the signal S5 transmitted between the CPU interface 5 and the background painter 7, the signal S6 transmitted between the CPU interface 5 and the color synthesizer 9, and the signal S7 transmitted between the CPU interface 5 and the graphic painter 8 are all interactive signals, because CPU 1 monitors operation of the parts, and varies parameters in the parts.

The controller 10 transmits signals S12 to S17 to the display device 4, the CPU interface 5, the ROM interface 6, the background painter 7, the graphic painter 8, and the color synthesizer 9 so that the parts 4 to 9 can properly work.

FIG. 3 is a block diagram illustrating a structure of the graphic painter 8. The graphic painter 8 is comprised of a selector 11, a parameter RAM 12, a graphic ROM address calculator 13, a graphic analyzer 14, a graphic buffer 15, an output device 16, and a timing producer 17.

The selector 11 selects one of an address signal ZB transmitted from the timing producer 17 and an EX-ADD signal provided from an external circuit (not illustrated), indicative of a predetermined value, and transmits the selected one to the parameter RAM 12 as an address.

The parameter RAM 12 stores such data as illustrated in FIG. 11. The parameter RAM 12 includes address word lines by the number equal to the number of graphics which can be stored in the graphic painter 8. Each of addresses indicates a number of graphics. Parameters as illustrated in FIG. 11 are designed to be assigned to each of graphics. When a graphic is displayed, CPU 1 determines the parameters, and then, displays the graphic accordingly.

On receipt of an address, the parameter RAM 12 transmits parameters P1 to P5 which are indicative of an address, a coordinate on X-axis, a coordinate on Y-axis, the number of graphics, and a translucence signal, respectively. The parameter RAM 12 receives a data signal EX-DATA and a write enable signal EX-WE from an external circuit (not illustrated).

The graphic ROM address calculator 13 calculates an address for the character ROM 3 to be displayed, based on the parameter P1, and transmits the thus calculated address to the character ROM 3 as R-ADD.

The graphic analyzer 14 receives the parameters P2 and P3 from the parameter RAM 12, and judges whether a graphic associated with a given address number is within a displayable area. The graphic analyzer 14 transmits both a signal ZK1 indicative of a number of graphics to be displayed, and a FIFO write enable signal F-WE to the graphic buffer 15.

The graphic buffer 15 stores background graphics therein.

The output device 16 receives image data R-DATA from the character ROM 3, and establishes a timing at which next data is transmitted to the color synthesizer 9, based on the parameters P2, P3, P4 and P5. The output device 16 transmits a signal S11 including a data signal H-DATA for a display buffer, a write enable signal H-WE for a display buffer, and an address signal H-ADD for a display buffer.

The timing producer 17 receives both a main clock signal Si and a signal S13 by which the graphic painter 8 is controlled, and transmits a graphic number signal ZB to the selector 11, a graphic number enable signal ZBDEN to the graphic analyzer 14, and a graphic buffer request signal Z-RQ to the graphic buffer 15. In addition, the timing producer 17 receives both a signal EMP indicating that the graphic buffer is empty and a graphic number signal ZKO from the graphic buffer 15, and transmits an output request signal S-RQ to the output device 16.

FIG. 4 is a block diagram of the color synthesizer 9. As illustrated in FIG. 4, the color synthesizer 9 is comprised of a color synthesis controller 50, first and second graphic selectors 51 and 52, first and second display buffers 53 and 54, selectors 55 and 56, an output controller 57, a translucence processor 58, a selector 59, and a pallet RAM 60.

The first display buffer 53 stores therein graphic images to be displayed, and the second display buffer 54 stores therein background images to be displayed. The first and second display buffers 53 and 54 transmit RGB images. The first and second display buffers 53 and 54 are designed to include double buffers one of which is used for making images and the other of which is used for displaying images. Each of the first and second display buffers 53 and 54 has a data input DIN, an address input ADD, a write enable terminal WE, a clock input C, and a data output DOUT.

The color synthesis controller 50 receives a signal S6 indicative of a color to be used, a signal S16 used for controlling color synthesis, and a main clock signal S1, and transmits address signals to the first and second display buffers 53 and 54, a write enable signal, a switch signal by which one of the selectors 55, 56 and 59 is activated.

The first and second selectors 51 and 52 receive a signal S10 indicative of background data and a signal S10 indicative of graphic data, respectively, and transmits the signals S10 to the first and second display buffers 53 and 54, respectively.

The pallet RAM 60 stores colors therein by the number of colors to be displayed.

The translucence processor 58 synthesizes image data transmitted from the first and second display buffers 53 and 54 through the selectors 55 and 56, with graphic data transmitted from the pallet RAM 60.

The output controller 57 transmits an image signal S4 to the display device 4.

Hereinbelow is explained an operation of the 2D graphic engine with reference to FIG. 5.

It is assumed that the 2D graphic engine can synthesize three backgrounds to one another, and that the first and second display buffers 53 and 54 have double buffers. Hereinbelow is explained an operation of one of the double buffers.

With reference to FIG. 5, parameters are given to the 2D graphics processor 2 in step 61. Specifically, CPU 1 provides parameters about a graphic to be displayed, to the 2D graphics processor 2. The parameter RAM 12 of the graphic painter 8 maps the parameters in such a manner as illustrated in FIG. 11.

Then, the 2D graphics processor 2 makes a graphic. That is, the background painter 7 and the graphic painter 8 cooperate with each other to thereby make a graphic.

In step 62, data about a first background is stored in a first background display buffer.

In step 63, data about a second background is stored in a second background display buffer.

In step 64, data about a third background is stored in a third background display buffer. Herein, data to be stored in the first to third background display buffers includes a pallet code value and a translucence value.

The background painter 7 transmits the signal S10 indicative of data to be displayed, in accordance with assigned parameters, and thus, image data is accumulated in the second display buffer 54 of the color synthesizer 9.

Since three backgrounds are to be displayed, the second display buffers 54 is designed to have an area for accumulating three backgrounds therein.

At the same time when the steps 62 to 64 are carried out, the step 65 is carried out. In step 65, the graphic painter 8 of the 2D graphics processor 2 makes judgement as to whether graphic data stored in the parameter RAM 12 is to be displayed, prior to making a graphic, by referring to mapped parameters in the parameter RAM 12. Then, only numbers of graphics to be displayed are stored in the graphic buffer 15 of the graphic painter 8.

Then, in step 66, graphic data is stored into the first display buffer 53. Herein, graphic data includes a pallet code value, a translucence value, and the number of backgrounds to be displayed.

The first display buffer 53 of the color synthesizer 9 is initialized into a predetermined value prior to making a graphic.

Then, the graphic painter 8 uses graphic numbers stored in the graphic buffer 15, as addresses to the parameter RAM 12, to thereby calculate display parameters, and transmits the signal S11 indicative of data to be displayed, to the first display buffer 53 of the color synthesizer 9.

FIG. 6 illustrates a relation between the signals S10 and S11, and data stored in the first and second display buffers 53 and 54. If an address to be stored in the display buffer is identical with an address having been already stored, the previous address is rewritten into the new one.

Thus, making a graphic is finished.

Then, in step 67, data about the first to third backgrounds and graphic data are taken out of the first and second display buffers 53 and 54, and are synthesized with one another in color to thereby make an image.

Then, the 2D graphics processor 2 displays the thus synthesized image.

When an image is to be displayed, data is taken out of the display buffers pixel by pixel in synchronization with the control signals S17 transmitted to the display device 4 from the controller 10. Then, color is synthesized in the translucence processor 58 of the color synthesizer 9, based on the thus taken out data, when a translucent pixel is seen this side.

The image data having been processed in step 67 is transmitted to the display device 4 as the image signal S4 indicative of RGB data. Then, an image indicated by the image signal S4 is displayed in the display device 4.

There have been suggested many apparatuses for processing backgrounds. For instance, Japanese Unexamined Patent Publication No. 6-180574 has suggested one of such apparatuses. In the suggested apparatus, a background and a graphic are separately processed, and they are synthesized with each other when displayed.

However, the suggested apparatus is accompanied with problems that since a background is synthesized with a graphic, if there exist a plurality of different-translucent graphics between backgrounds, it would be impossible to make a correct image, and that an increase in the number of parts would be unavoidable, because display buffers have to be arranged between graphics and backgrounds.

For instance, a graphics engine for an arcade game is designed to have character ROMs for a background and a graphic for enhancing an ability of making an image, because high speed processing is taken preference over an increase in the number of parts. However, if character ROMs are arranged separately for a background and a graphic, it is not possible to simultaneously process a background and a graphic when displayed.

In order to solve such a problem, Japanese Unexamined Patent Publication No. 5-27745 has suggested a method of synthesizing a background and a graphic with each other. In addition, it is possible to reduce the number of parts in accordance with the suggested method.

However, this method is accompanied with a problem that since a background is first made, and then, a graphic is overlapped over the background, it would be impossible to process a plurality of backgrounds and graphics in translucence.

Hereinbelow, the above-mentioned problems are detailed with reference to FIG. 1.

For instance, the apparatus suggested in Japanese Unexamined Patent Publication No. 6-180574 can process a background and a graphic in translucence, but cannot process graphics such as SP1 and SP2 in translucence. Though a resultant image is desired to be composed of mixture of SP1 and SP2, an image actually output from the 2D graphics is composed only of SP1.

Japanese Unexamined Patent Publication No. 63-273894 has suggested a method of controlling a display, comprising the steps of storing a graphic image and at least two overlay images into memories, respectively, outputting an image having a higher priority, when images read out of the memories overlap one another, and displaying an image composed of the graphic and overlay images overlapping one another.

Japanese Unexamined Patent Publication No. 63-316891 has suggested a display device comprising a display device, an output display buffer associated with the display device, at least one virtual display buffer, means for extracting data out of an area of the virtual display buffer, means for combining data extracted out of areas of the virtual display buffer, and transmitting the extracted data to the output display buffer, an input interface, means for switching windows, means for measuring a time during which data can be input into the windows, means for storing data about the thus measured time for each of the windows, and means for determining a priority of the windows in accordance with the data. The windows are switched in accordance with the thus determined priority.

Japanese Unexamined Patent Publication No. 64-76092 has suggested a display device. In accordance with the suggested display device, when multi-gradation display and overlapping display are simultaneously carried out on CRT, it would be possible to reduce a capacity of a memory down to a half, comparing to multi-gradation display to be carried out by merely overlapping images.

Japanese Unexamined Patent Publication No. 2-96220 has suggested a device for overlapping images one another to make a graphic. The suggested device makes it possible to smoothly switch screens of multi-windows, and select a desired shape of an area where an image is to be displayed, resulting in that an area where an image is to be displayed can be varied rapidly.

Japanese Unexamined Patent Publication No. 3-253892 has suggested a display device comprising a plurality of display desks, means for scrolling each of the display desks independently of one another or simultaneously, and a controller for synthesizing the display desks with one another to thereby make an image to be displayed.

Japanese Unexamined Patent Publication No. 4-140792 has suggested an image processor comprising a color RAM storing image data including color data, a translucence processor which mixes first image data read out of the color RAM and second image data read out of the color RAM in a predetermined ratio to thereby make translucent image data, and a digital-to-analog converter converting the image data having been processed by the translucence processor, from digital to analog, and transmitting the thus converted analog data to a display.

Japanese Unexamined Patent Publication No. 5-225328 has suggested a device capable of displaying images made based on a plurality of image sources.

Japanese Unexamined Patent Publication No. 9-330422 has suggested a method of three-dimensionally displaying images. The method makes it possible to three-dimensionally display images without determining an order of making graphics, even if a plurality of translucent graphics overlap one another.

Japanese Unexamined Patent Publication No. 10-214337 has suggested a device for processing an image in translucence, comprising first means for blending color data read out of a memory pixel by pixel with given color data in a predetermined ratio, and second means for filtering the resultant color data transmitted from the first means in a predetermined filtering coefficient, and storing the resultant color data into the memory.

Japanese Unexamined Patent Publication No. 11-15463 has suggested an image processing apparatus comprising: first means for producing a timing, which first means receives a clock signal, a vertical synchronization signal and a horizontal synchronization signal, and transmits a signal for controlling second means, a display initializing signal, a display address signal, and a signal for switching displays; second means including a memory storing original data of an image to be displayed, which second means receives a clock signal and a signal for controlling the second means, and transmits a signal indicative of data of an image to be displayed, a display buffer write enable signal, and a display buffer image address signal; a selector which receives a display buffer image address signal, a display address signal and a signal for switching displays, selects one of the display buffer image address signal and the display address signal in accordance with the signal for switching displays, and transmits the selected signal as a display buffer address signal; display buffer means which receives a clock signal, a signal indicative of data of an image to be displayed, a display buffer write enable signal and a display buffer address signal, and transmits a display data signal; a status register which receives a clock signal, a display initializing signal, and a display buffer address signal, and transmits a mask signal for masking the display data signal; and masking means for receiving the display data signal and the mask signal, and transmits the display data signal after the display data signal has been masked in accordance with the mask signal.

However, the above-mentioned problem remains unsolved even by the above-mentioned suggestions.

SUMMARY OF THE INVENTION

It is an object of the present invention to provide an apparatus for displaying two-dimensional image by synthesizing a background and a graphic to each other in translucence, which apparatus is capable of applying translucence processing to all graphics as well as to a background and a single graphic without an increase in the number of display buffers.

In one aspect of the present invention, there is provided an apparatus for displaying two-dimensional image by synthesizing a background and a graphic to each other in translucence, including a single display buffer into which background data and graphic data both having been processed in translucence are stored, and into which RGB data is stored, the RGB data being produced by processing images in translucence in an order where a deeper image as viewed from a display screen is earlier processed.

There is further provided an apparatus for displaying two-dimensional image by synthesizing a background and a graphic to each other in translucence, including (a) a display device in which two-dimensional images are displayed, (b) a single display buffer storing graphic data therein, (c) graphic buffers by the number equal to the number of backgrounds to be displayed, and (d) a processor which stores data of backgrounds into the display buffer in an order from data located at a bottom to data located at a top as viewed from a display screen, and stores each of numbers of graphics into each of graphic buffers associated with a background to be displayed.

There is still further provided an apparatus for displaying two-dimensional image by synthesizing a background and a graphic to each other in translucence, including (a) graphic buffers by the number equal to the number of backgrounds to be displayed, (b) a single display buffer, (c) a first processor which identifies a background on which a graphic is to be displayed, and stores a graphic number of the graphic into a graphic buffer associated with the thus identified background, and (d) a second processor which processes both background data and graphic data associated with each of the backgrounds in translucence in an order where a deeper background as viewed from a display screen is earlier processed, and stores resultant RGB data into the display buffer.

It is preferable that if graphic data has been already stored in the display buffer, the second processor reads the graphic data out of the display buffer, processes both the background data and the thus read out graphic data in translucence, and stores resultant RGB data into the display buffer.

There is yet further provided an apparatus for displaying two-dimensional image by synthesizing a background and a graphic to each other in translucence, including (a) a background painter which processes background data and transmits a signal accordingly, (b) a graphic painter including (b1) graphic buffers by the number equal to the number of backgrounds to be displayed, (b2) a memory storing parameters of graphics to be displayed, (b3) a graphic analyzer which makes judgement as to whether a graphic associated with a given graphic number is within a displayable area, based on the parameters stored in the memory, and stores the graphic number into a graphic buffer associated with a background to which the graphic is to be synthesized, and (b4) an output device which outputs data about the graphic, and (c) a color synthesizer including (c1) a display buffer storing therein graphics data to be displayed, and (c2) a processor which processes data in translucency, and stores the resultant into the display buffer.

It is preferable that the processor processes background data transmitted from the background painter, graphics data transmitted from the graphic painter, and image data transmitted from the display buffer.

It is preferable that the color synthesizer further includes a pallet random access memory storing image data therein.

It is preferable that the processor processes background data transmitted from the background painter, graphics data transmitted from the graphic painter, image data transmitted from the pallet random access memory, and image data transmitted from the display buffer.

In another aspect of the present invention, there is provided a method of displaying two-dimensional image by synthesizing-a background and a graphic to each other in translucence, including the steps of (a) processing both background data and graphic data in translucence, (b) storing the thus processed background data and graphic data into a single display buffer, (c) processing images in translucence in an order where a deeper image as viewed from a display screen is earlier processed, to thereby produce RGB data, (d) storing the RGB data into the display buffer, and (e) displaying images stored in the display buffer.

There is further provided a method of displaying two-dimensional image by synthesizing a background and a graphic to each other in translucence, including the steps of (a) storing data of backgrounds into a single display buffer in an order from data located at a bottom to data located at a top as viewed from a display screen, (b) storing each of numbers of graphics into each of graphic buffers associated with a background to be displayed, and (c) displaying images in the display screen.

There is still further provided a method of displaying two-dimensional image by synthesizing a background and a graphic to each other in translucence, including the steps of (a) identifying a background on which a graphic is to be displayed, (b) storing a graphic number of the graphic into a graphic buffer associated with the thus identified background, (c) processing both background data and graphic data associated with each of the backgrounds in translucence in an order where a deeper background as viewed from a display screen is earlier processed, (d) storing resultant RGB data into a single display buffer, and (e) displaying images, based on the RGB data stored in the display buffer.

It is preferable that the method further includes the steps of (f) if graphic data has been already stored in the display buffer, reading the graphic data out of the display buffer, (g) processing both the background data and the thus read out graphic data in translucence, and (h) storing resultant RGB data into the display buffer.

The advantages obtained by the aforementioned present invention will be described hereinbelow.

In accordance with the present invention, a background and a graphic are simultaneously processed in translucence, and then, stored in a display buffer. Hence, a display buffer is necessary by only one, ensuring reduction in the number of parts.

In accordance with the present invention, images located deeper as viewed from a display screen are earlier processed in translucence, and then, RGB data is stored into the display buffer. Hence, it is possible apply translucence processing to all graphics to be displayed.

The above and other objects and advantageous features of the present invention will be made apparent from the following description made with reference to the accompany-

BRIEF DESCRIPTION OF THE DRAWINGS

FIG. 6 illustrates background and graphic data to be displayed in the 2D graphics engine illustrated in FIG. 2, and data accumulated in display buffers.

FIG. 11 illustrates a map stored in the character ROM.

FIG. 15 illustrates background and graphic data to be displayed in the 2D graphics engine illustrated in FIG. 7, and data accumulated in display buffers.

DESCRIPTION OF THE PREFERRED EMBODIMENTS

Figure 1:
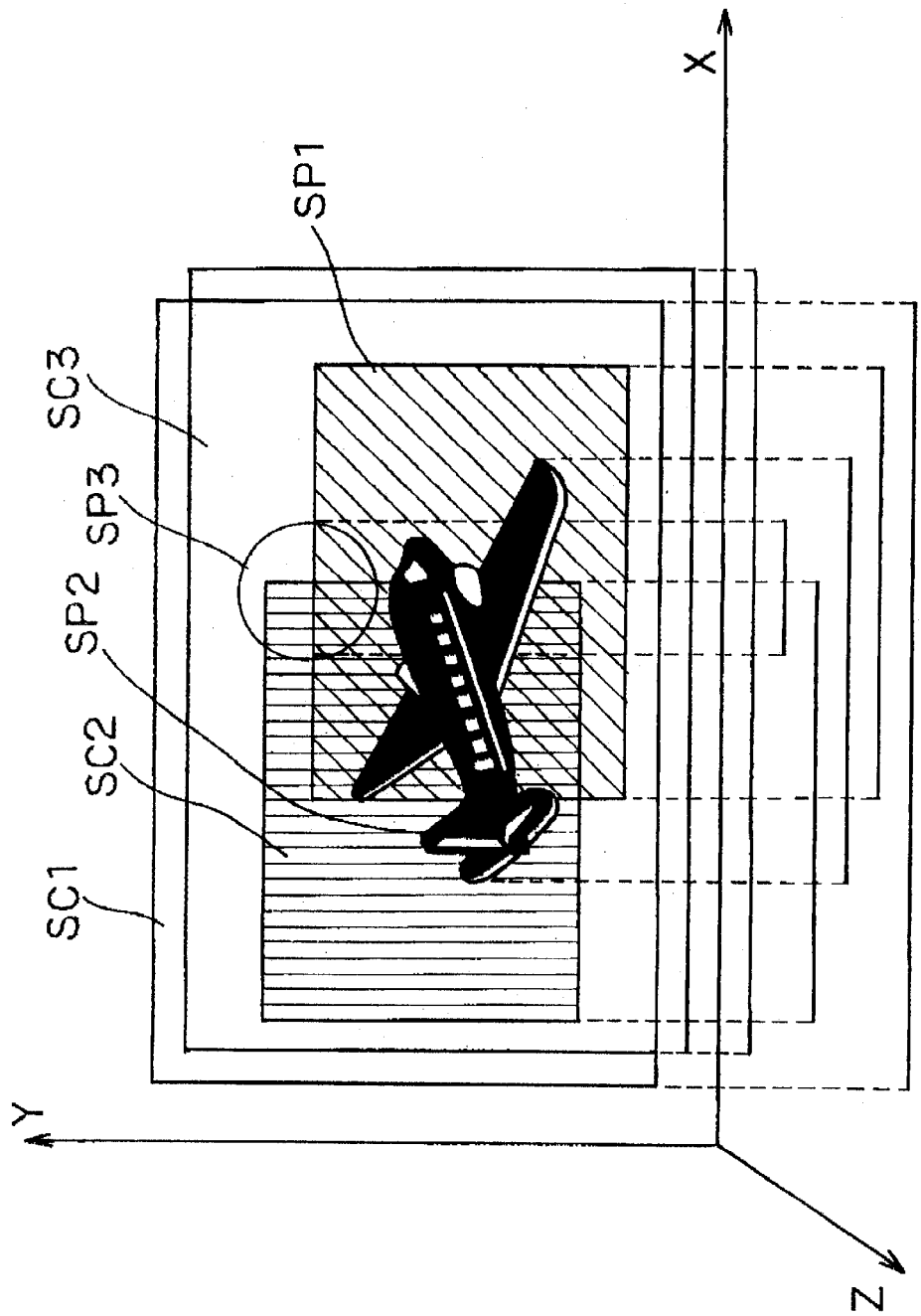
FIG. 1 is a perspective view illustrating an example of a graphic to be displayed.
Figure 2:
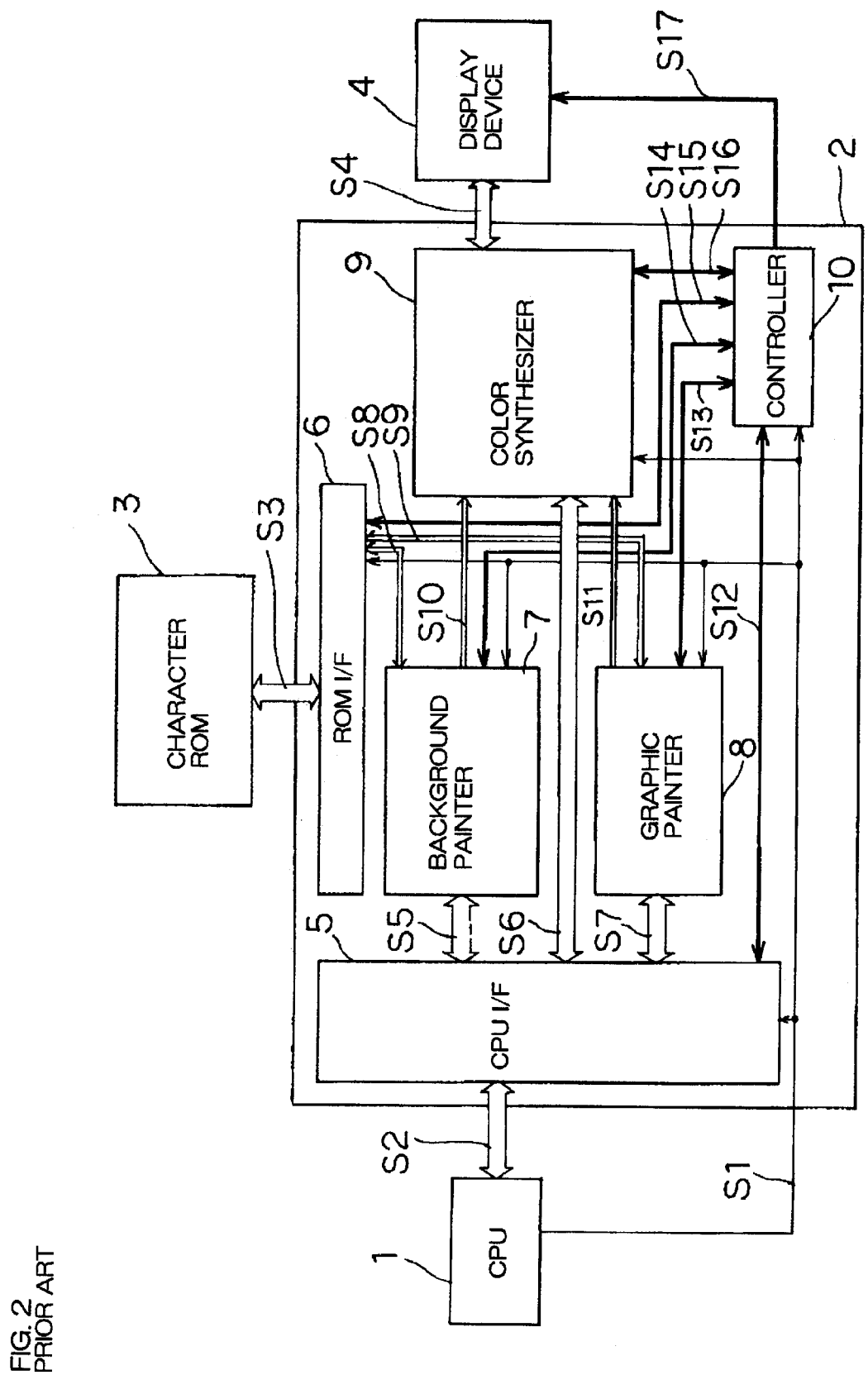
FIG. 2 is a block diagram of a conventional two-dimensional graphics engine.
Figure 3:
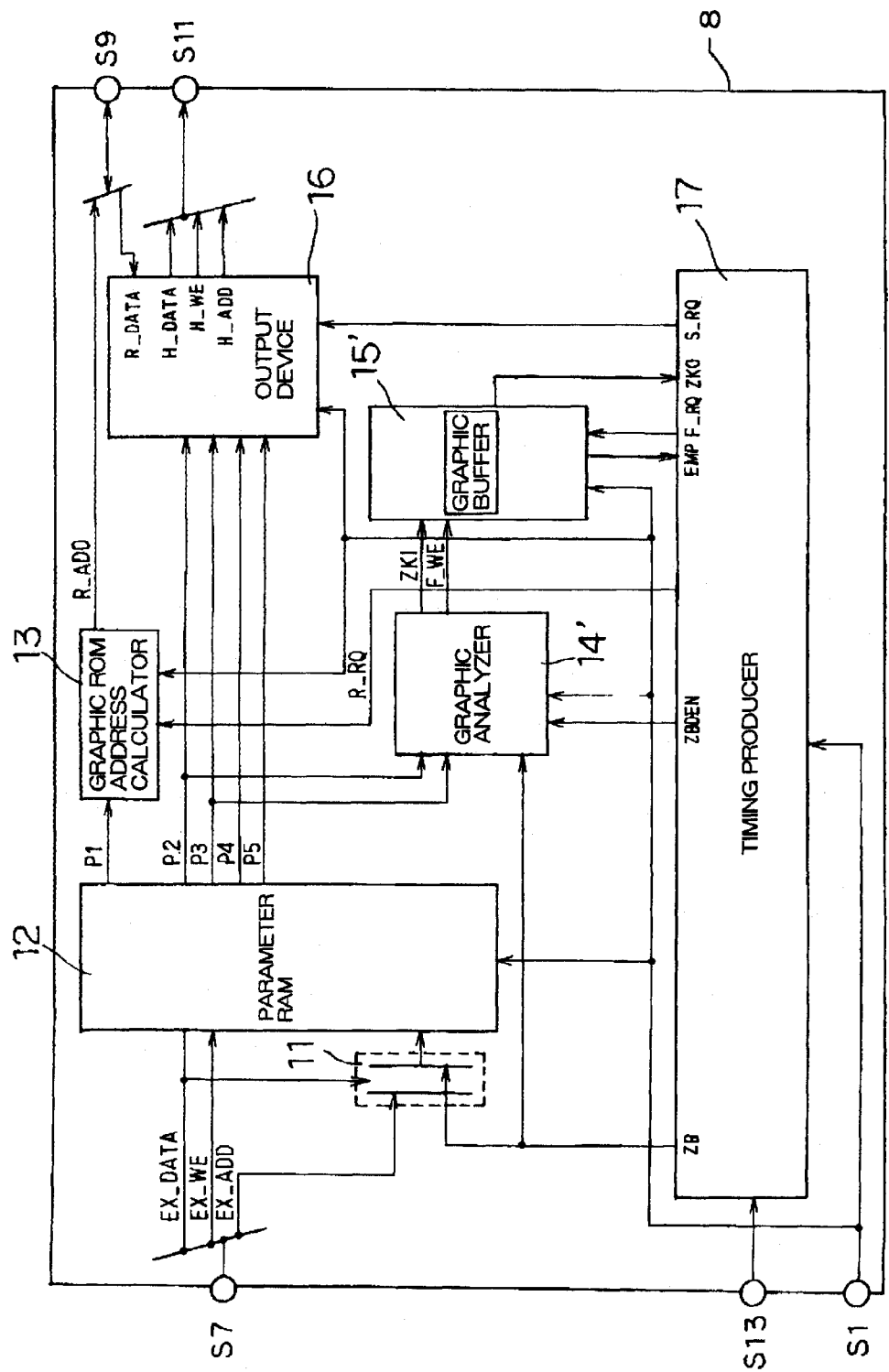
FIG. 3 is a block diagram of the graphic painter of the 2D graphics engine illustrated in FIG. 2.
Figure 4:
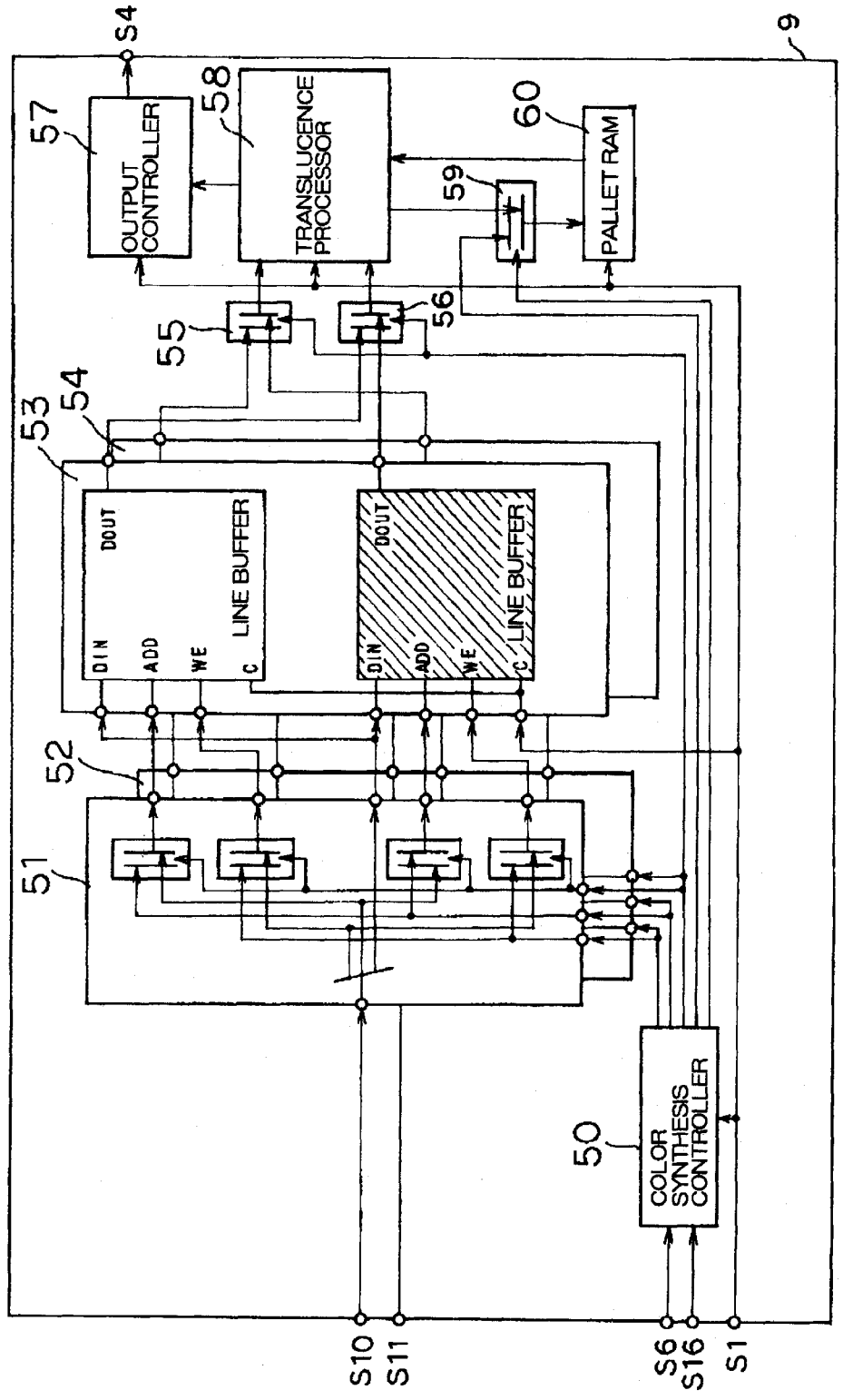
FIG. 4 is a block diagram of the color synthesizer of the 2D graphics engine illustrated in FIG. 2.
Figure 5:
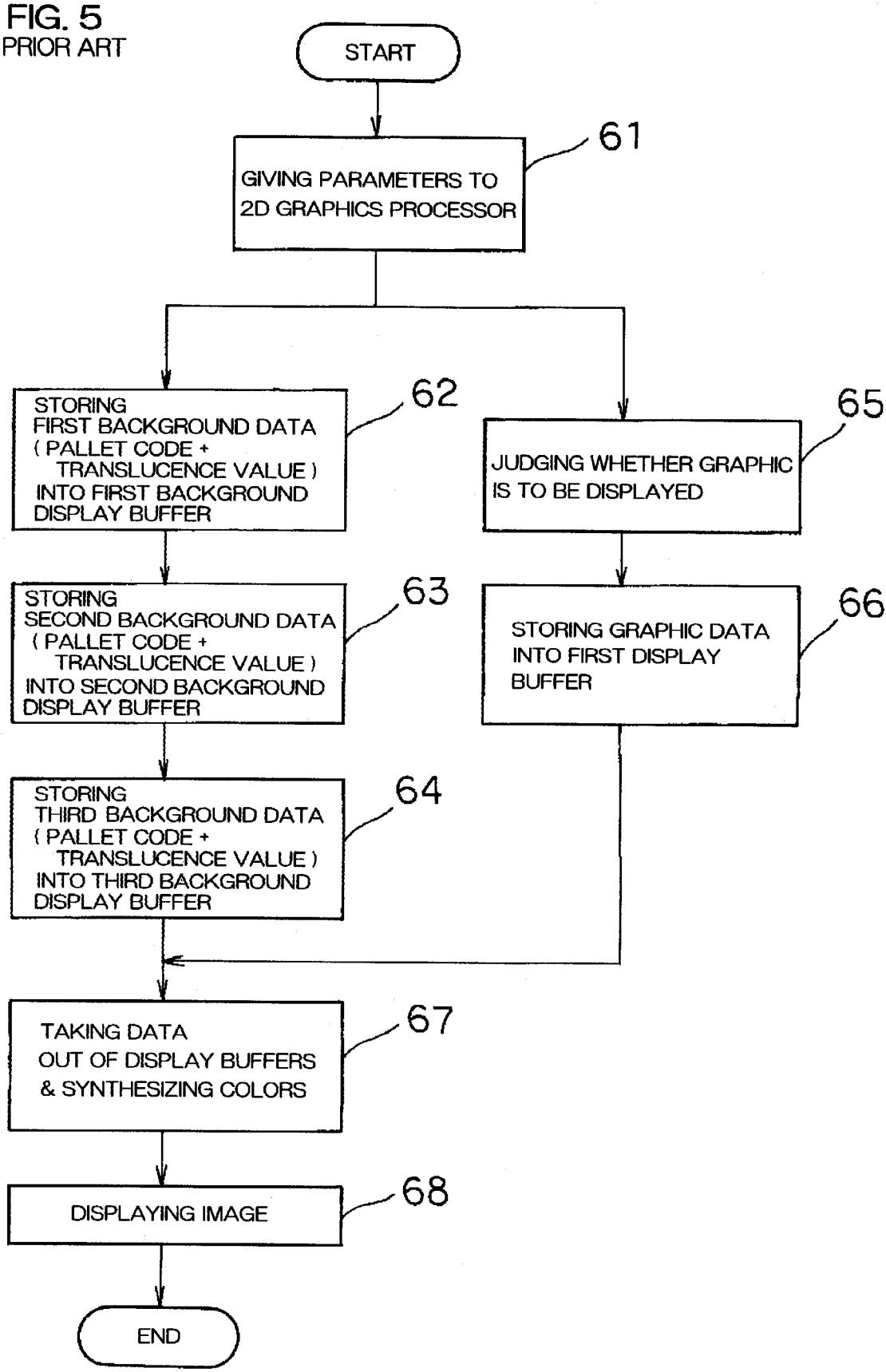
FIG. 5 is a flow chart of an operation of the 2D graphics engine illustrated in FIG. 2.
Figure 7:
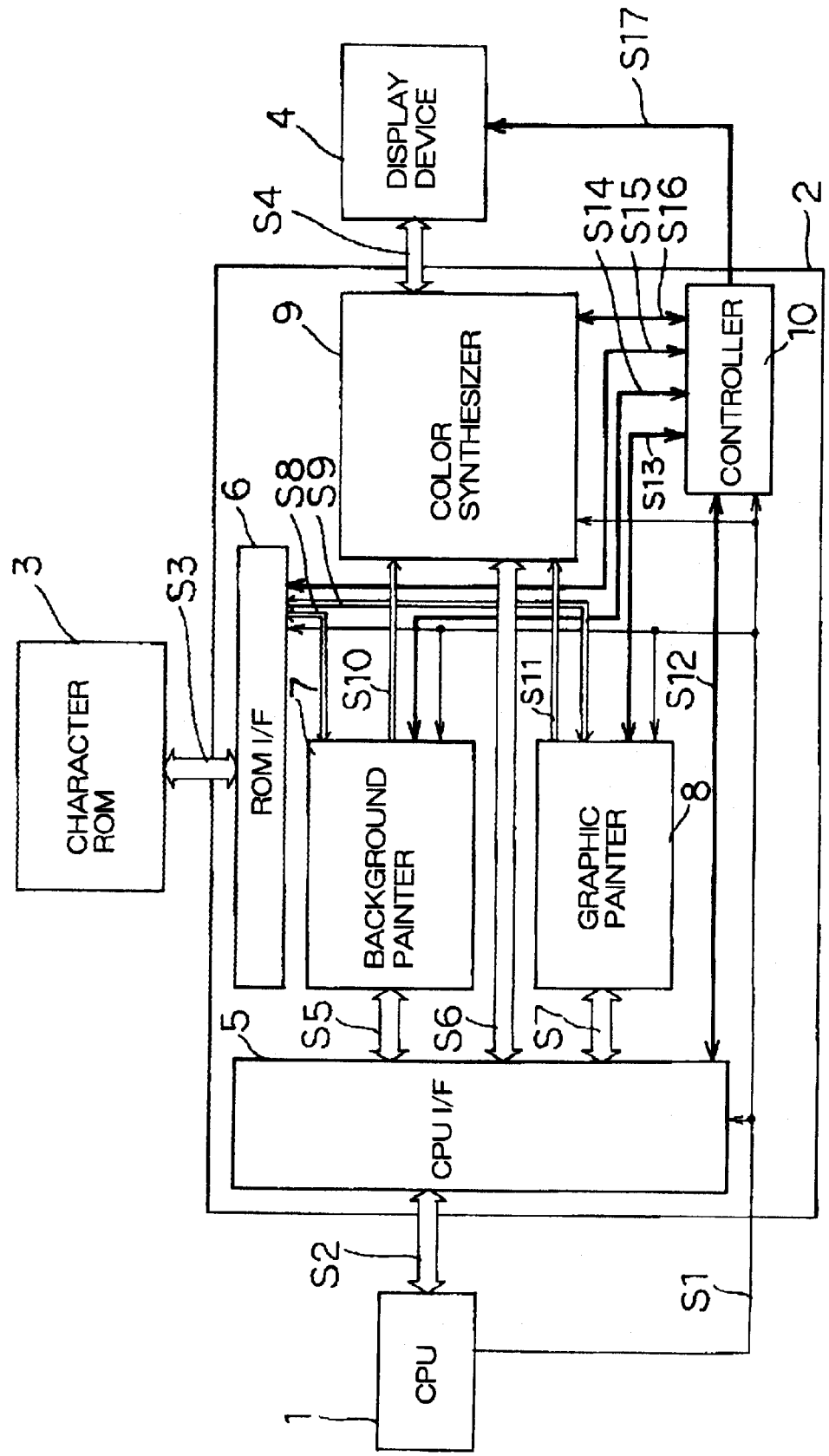
FIG. 7 is a block diagram of a two-dimensional graphics engine in accordance with a preferred embodiment of the present invention.

FIG. 7 is a block diagram illustrating a structure of a two-dimensional graphic engine in accordance with an embodiment of the present invention.

The illustrated two-dimensional graphic engine is comprised of a central processing unit (CPU) 1, a two-dimensional (2D) graphics processor 2, a character ROM 3, and a display device 4.

The 2D graphics processor 2 is comprised of a CPU interface 5, a ROM interface 6, a background painter 7, a graphic painter 8, a color synthesizer 9, and a controller 10.

Figure 10:
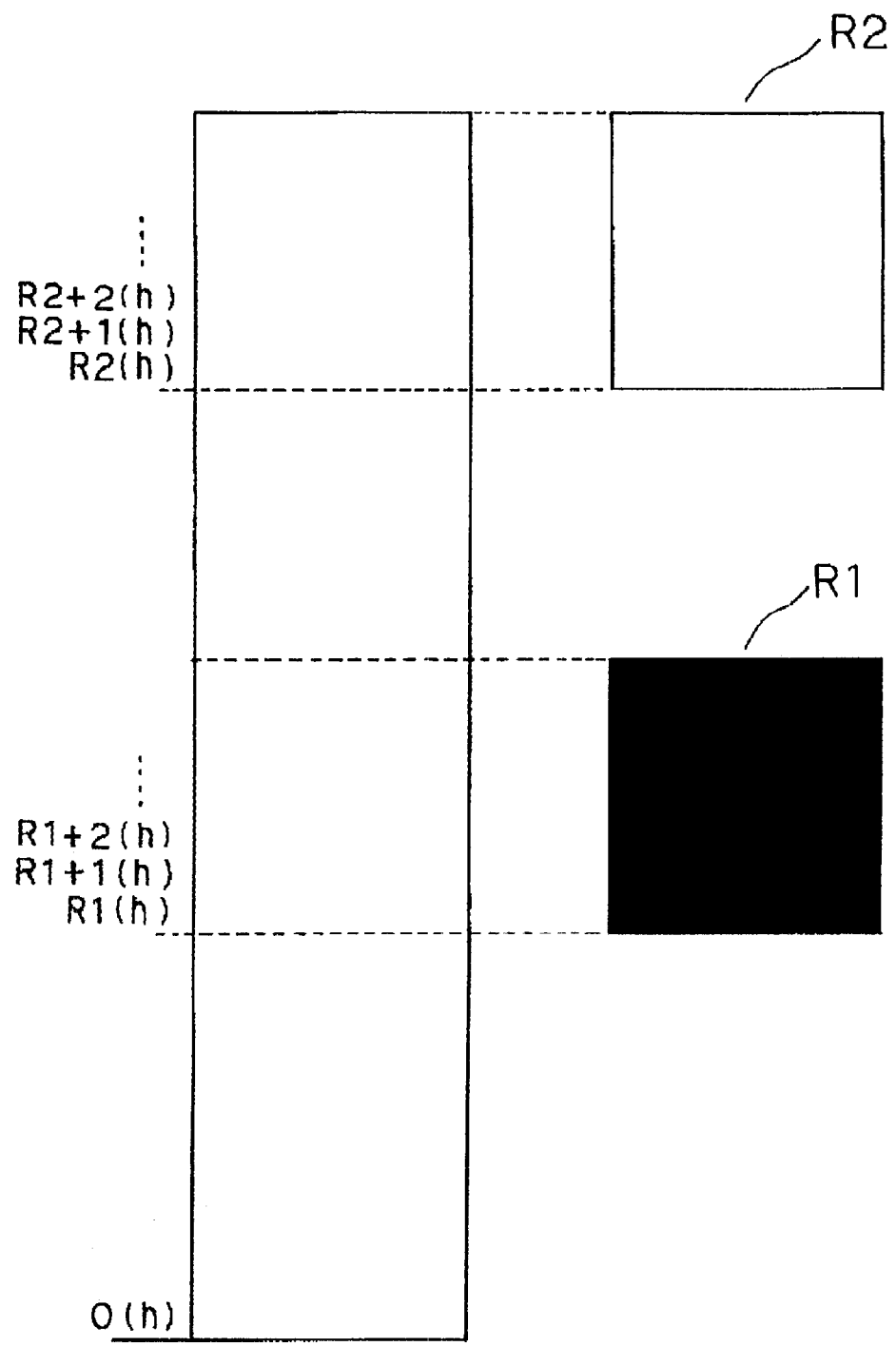
FIG. 10 illustrates a map stored in the parameter RAM.

The character ROM 3 stores data about images to be displayed in the display device 4. The stored data is mapped in the character ROM 3 in such a manner as illustrated in FIG. 10.

As mentioned below, since the color synthesizer 9 includes a pallet RAM 20, a pallet code, that is, an address for the pallet RAM 20, is stored in the character ROM 3 pixel by pixel. Signals S3 indicative of address data of the character ROM 3 are transmitted between the character ROM 3 and the ROM interface 6.

The display device 4 is comprised of a cathode ray tube (CRT) or a liquid crystal display (LCD), for instance, and displays images thereon. The display device 4 receives signals S4 indicative of RGB data from the color synthesizer 9, and also receives synchronization signals S17 such as $V_{SYNC}$ and $H_{SYNC}$, from the controller 10.

The CPU interface 5 receives signals S2 from CPU 1, indicating where a graphic is to be displayed on a display screen of the display device 4, and specification of the 2D graphics engine.

The ROM interface 6 adjusts a timing at which the 2D graphics processor 2 provides an address to the character ROM 3 to thereby gain data from the character ROM 3.

The background painter 7 processes backgrounds, that is, adheres data stored in the character ROM 3, entirely onto a screen of the display device 4. The background painter 7 receives signals S5 from the CPU interface 5, indicating that which data among data stored in the character ROM 3 is to be displayed on a screen of the display device 4.

The graphic painter 8 makes a graphic of 16×16 dot, for instance, in the character ROM 3, and transmits a signal S7 to the CPU interface 5, indicating that on which coordinate system the thus made graphic is to be displayed in the display device 4. A coordinate system which the graphic painter 8 recognizes has to be greater than a display screen of the display device 4. If a coordinate system which does not exist in the display screen is indicated, a designated graphic cannot be displayed.

A signal S2 transmitted between CPU 1 and the CPU interface 5, a signal S3 transmitted between the character ROM 3 and the ROM interface 6, a signal S4 transmitted between the display device 4 and the color synthesizer 9, a signal S5 transmitted between the CPU interface 5 and the background painter 7, a signal S6 transmitted between the CPU interface 5 and the color synthesizer 9, and a signal S7 transmitted between the CPU interface 5 and the graphic painter 8 are all interactive signals, because CPU 1 monitors operation of the parts, and varies parameters in the parts.

The controller 10 transmits signals S12 to S17 to the display device 4, the CPU interface 5, the ROM interface 6, the background painter 7, the graphic painter 8, and the color synthesizer 9 so that the parts 4 to 9 can properly work.

Figure 8:
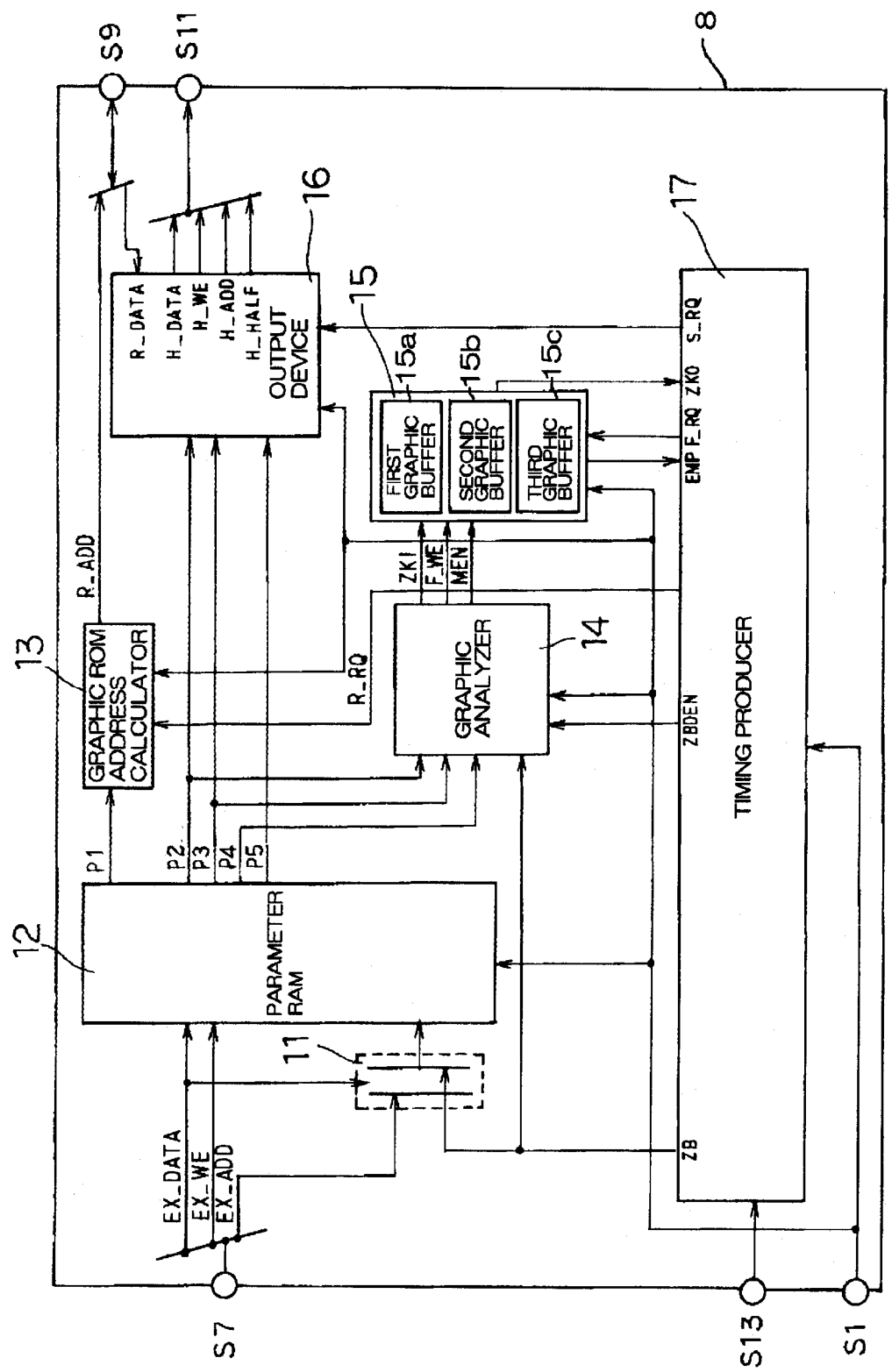
FIG. 8 is a block diagram of the graphic painter which is a part of the 2D graphics engine illustrated in FIG. 7.

FIG. 8 is a block diagram illustrating a structure of the graphic painter 8. The graphic painter 8 is comprised of a selector 11, a parameter RAM 12, a graphic ROM address calculator 13, a graphic analyzer 14, a graphic buffer 15, an output device 16, and a timing producer 17.

The selector 11 selects one of an address signal ZB transmitted from the timing producer 17 and an EX-ADD signal provided from an external circuit (not illustrated), indicative of a predetermined value, and transmits the selected one to the parameter RAM 12 as an address.

The parameter RAM 12 stores such data as illustrated in FIG. 11. The parameter RAM 12 includes address word lines by the number equal to the number of graphics which can be stored in the graphic painter 8. Each of addresses indicates a number of each of graphics. Parameters as illustrated in FIG. 11 are designed to be assigned to each of graphics. When a graphic is displayed, CPU 1 determines the parameters, and then, displays the graphic accordingly.

On receipt of an address, the parameter RAM 12 transmits parameters P1 to P5 which are indicative of an address, a coordinate on X-axis, a coordinate on Y-axis, the number of graphics, and a translucence signal, respectively. The parameter RAM 12 receives a data signal EX-DATA and a write enable signal EX-WE from an external circuit (not illustrated).

The graphic ROM address calculator 13 calculates an address for the character ROM 3 to be displayed, based on the parameter P1, and transmits the thus calculated address to the character ROM 3 as R-ADD.

The graphic analyzer 14 receives the parameters P2 and P3 from the parameter RAM 12, and judges whether a graphic associated with a given address number is within a displayable area. The graphic analyzer 14 transmits both a signal ZK1 indicative of a number of graphics to be displayed, and a FIFO write enable signal F-WE to the graphic buffer 15.

The graphic buffer 15 stores background graphics therein. In the embodiment, the graphic buffer 15 is comprised of a first graphic buffer 15a for storing a first background, a second graphic buffer 15b for storing a second background, and a third graphic buffer 15c for storing a third background.

The output device 16 receives image data R-DATA from the character ROM 3, and establishes a timing at which next data is transmitted to the color synthesizer 9, based on the parameters P2, P3, P4 and P5. The output device 16 transmits a signal S11 including a display buffer data signal H-DATA, a display buffer write enable signal H-WE, and a display buffer address signal H-ADD.

The timing producer 17 receives both a main clock signal Si and a signal S13 by which the graphic painter 8 is controlled, and transmits a graphic number signal ZB to the selector 11, a graphic number enable signal ZBDEN to the graphic analyzer 14, and a graphic buffer request signal Z-RQ to the graphic buffer 15. In addition, the timing producer 17 receives both a signal EMP indicating that the graphic buffer is empty, and a graphic number signal ZKO from the graphic buffer 15, and transmits an output request signal S-RQ to the output device 16.

Figure 9:
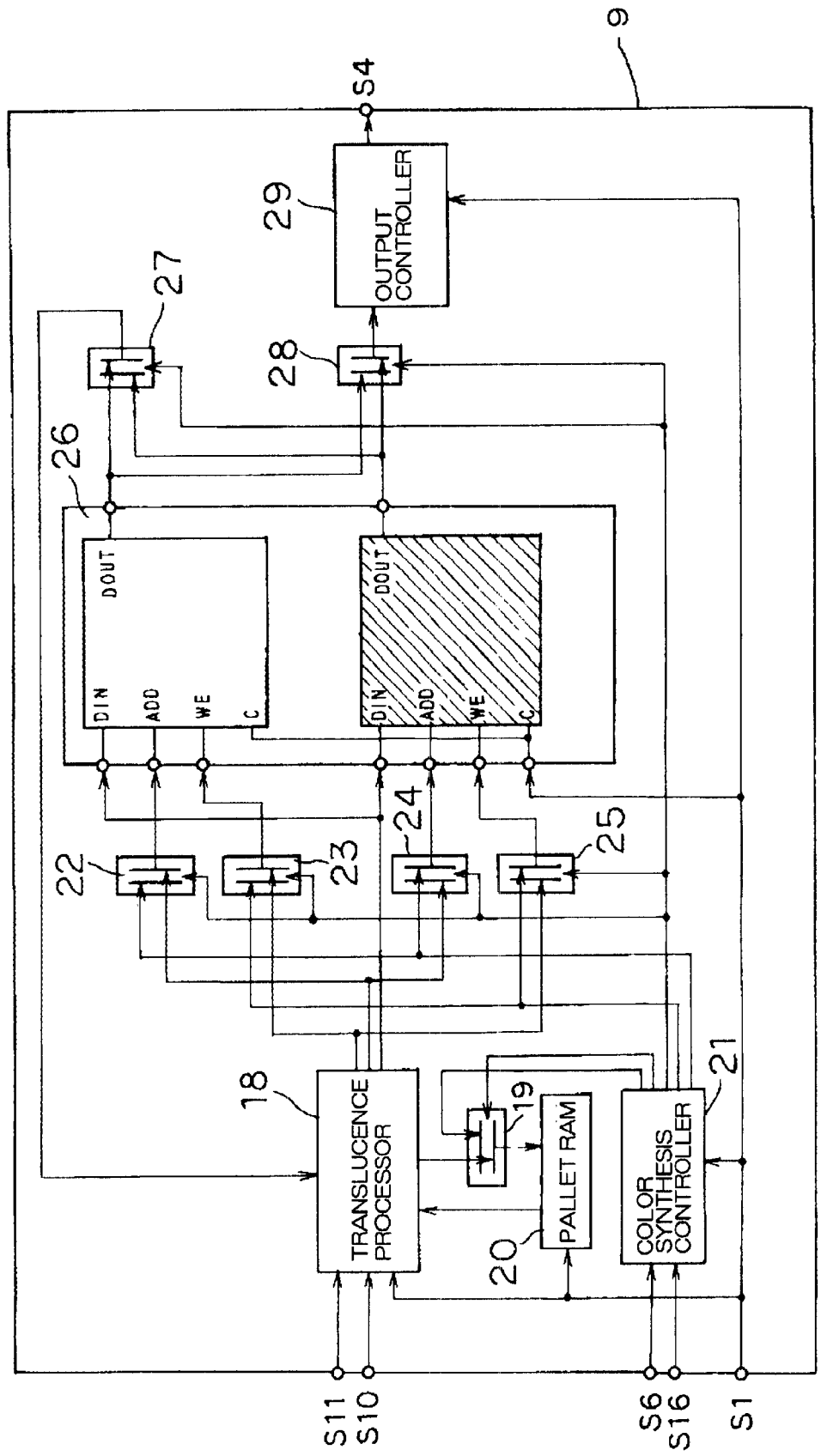
FIG. 9 is a block diagram of the color synthesizer which is a part of the 2D graphics engine illustrated in FIG. 7.

FIG. 9 is a block diagram of the color synthesizer 9. As illustrated in FIG. 9, the color synthesizer 9 is comprised of a translucence processor 18, a selector 19, a pallet RAM 20, a color synthesis controller 21, first to fourth selectors 22 to 25, a line buffer 26, fifth and sixth selectors 26 and 27, an output controller 29.

The translucence processor 18 synthesizes color by blending. Specifically, the translucence processor 18 takes graphic data, as illustrated in FIG. 10, out of the line buffer 26, based on the address H-ADD data transmitted from the background painter 7 and the graphic painter 8, and at the same time, takes graphic data out of the pallet RAM 20 through the use of H-DATA (pallet code) obtained by having processed data transmitted from the character ROM 3, as an address to the pallet RAM 20. Then, the translucence processor 18 synthesizes graphic data such as RGB transmitted from the display buffer 15 and graphic data such as RGB transmitted from the pallet RAM 20 with each other in color, based on a translucence output signal H-HALF.

The selector 19 switches a color to be registered into the pallet RAM 20 from CPU 1, into a pallet code transmitted from the translucence processor 18.

The pallet RAM 20 stores colors therein by the number of colors to be displayed.

The color synthesis controller 21 produces timing signals so as not to interfere with the above-mentioned steps.

The display buffer 26 stores therein graphic data to be displayed, and transmits graphic data such as RGB data, as illustrated in FIG. 10.

The first and third selectors 22 and 24 select one of an address H-ADD for making images and a display address transmitted from the color synthesis controller 21. The display buffer 26 is designed to have double buffers one of which is for making an image, and the other for displaying an image.

When the display buffer 26 is comprised of a line buffer, the display buffer 26 is switched every time a scanning line is switched. When the display buffer 26 is comprised of a frame buffer, the display buffer 26 is switched every time a screen is switched.

The second and fourth selectors 23 and 25 switch write enable bar signals as well as display buffer addresses.

The fifth and sixth selectors 27 and 28 select only an output transmitted from the image-displaying buffer among the double buffers constituting the display buffer 26, and transmits the thus selected output.

The output controller 29 transmits an image signal S4 to the display device 4.

Hereinbelow is explained an operation of the 2D graphic engine in accordance with the embodiment. In this embodiment, the first background is displayed just this side, and the third background is displayed deepest, as viewed from a display screen of the display device 4. Priority at which a background and a graphic are displayed is dependent on a plane number assigned to each of backgrounds and graphics.

Figure 12:
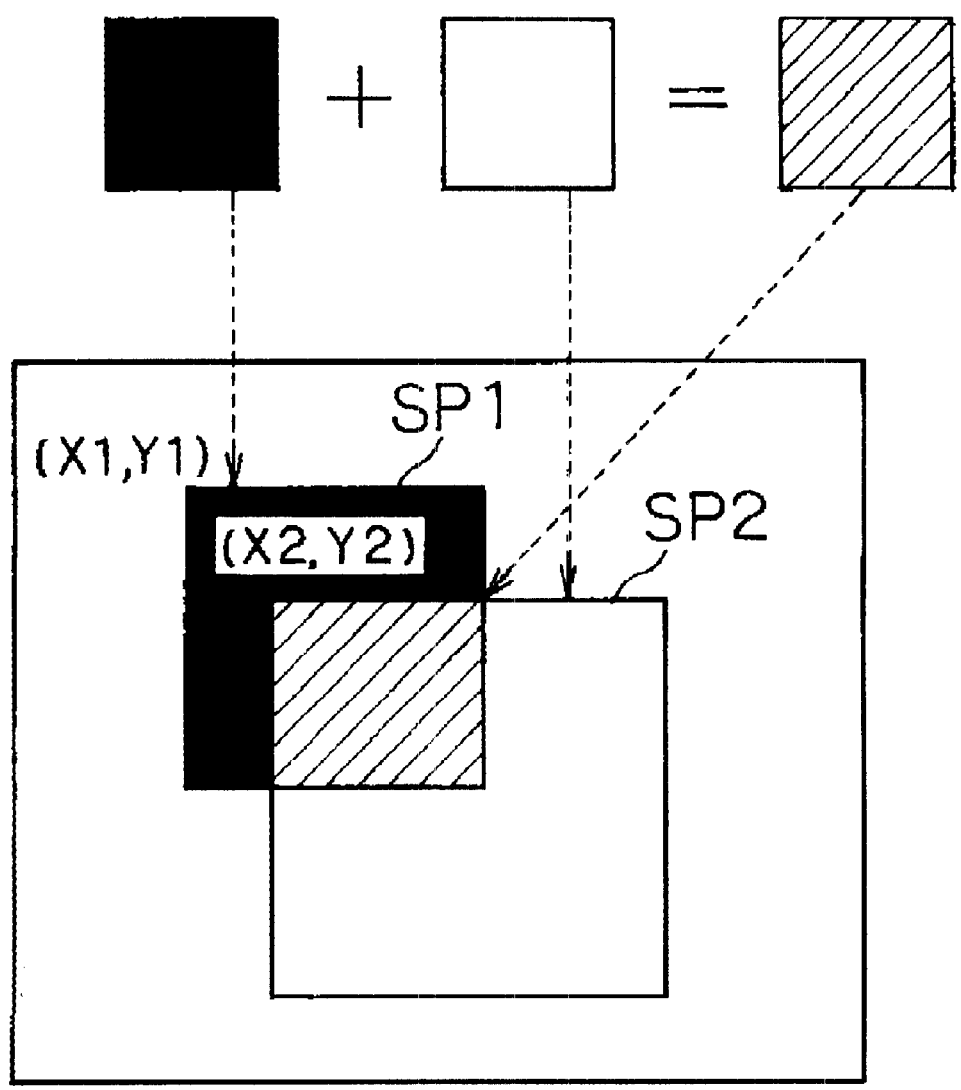
FIG. 12 illustrates an example of displaying an image in translucence.

As an example of translucence display, it is assumed that graphic data R1 and graphic data R2 both illustrated in FIG. 10 are displayed according to parameters shown in the parameter RAM map illustrated in FIG. 11. It is also assumed that the graphic data R1 is transmitted as the graphic SP1 and the graphic data R2 is transmitted as the graphic data SP2. By applying translucence processing to the graphic SP2, such an example of translucence display as illustrated in FIG. 12 is obtained.

Under the above-mentioned assumption, operation of the 2D graphic engine is explained hereinbelow with reference to FIGS. 13 and 14.

Figure 13:
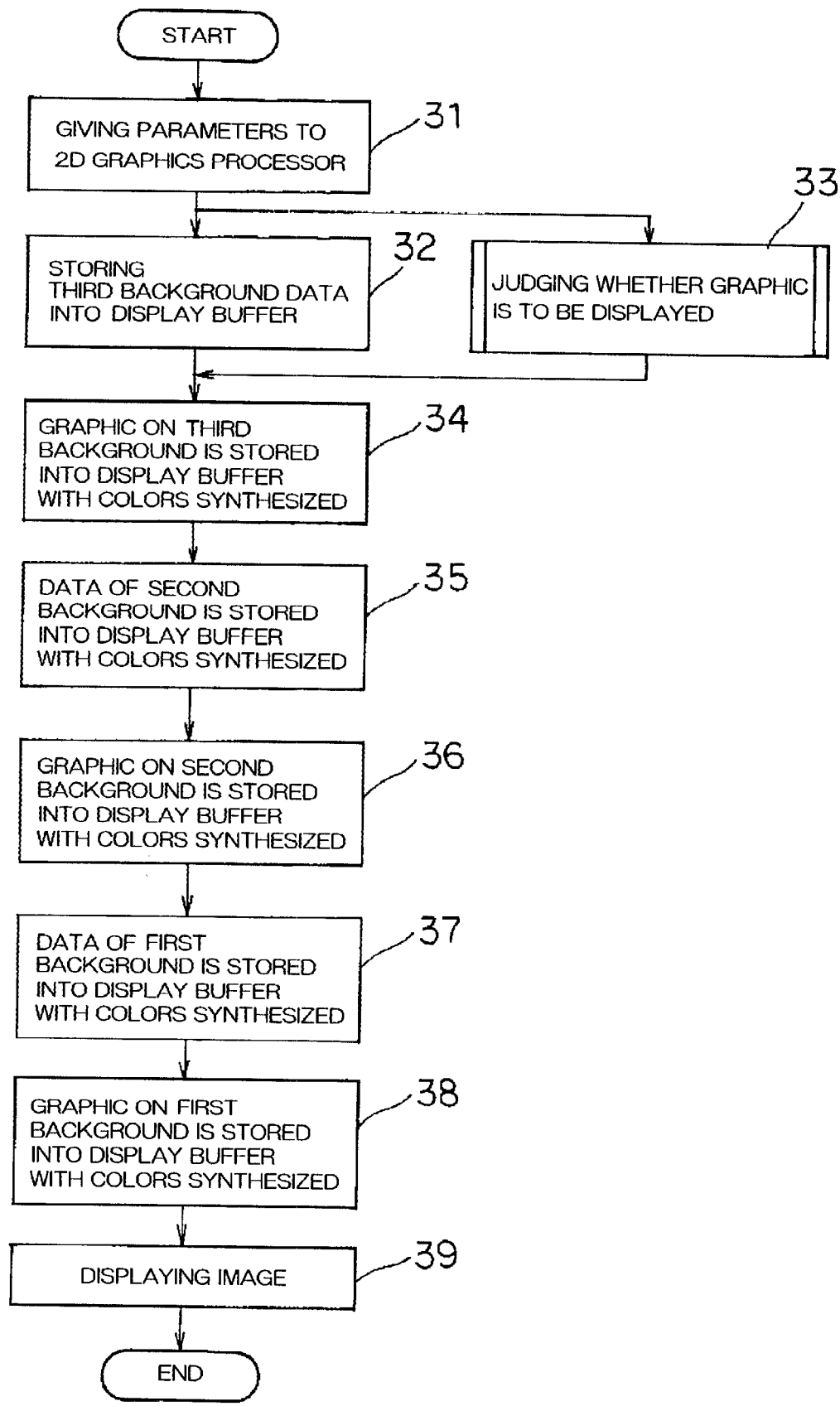
FIG. 13 is a flow chart of an operation of the 2D graphics engine illustrated in FIG. 7.

With reference to FIG. 13, CPU 1 determines a graphic to be displayed, and informs the 2D graphics processor 2 of the thus determined graphic in step 31. Specifically, CPU 1 transmits the parameters illustrated in FIG. 15 to the background painter 7 and the graphic painter 8, respectively, and color data such as RGB illustrated in FIG. 15 to the parameter RAM 20.

Then, RGB data about the third background is stored into the display buffer 26 in step 32. Specifically, the 2D graphic processor 2 makes an image of the third background to be located deepest as viewed from a display screen.

The background painter 7 transmits the background data signal S10, based on a number of images to be made, and stores image data about the third background into the display buffer 26. At this stage, data S10 accumulated in the display buffer 26 has such a structure as illustrated in FIG. 15.

If the background image is not to be displayed, the display buffer 26 is initialized.

At the same time when step 32 is carried out, step 33 is carried out for judging whether each of graphics is to be displayed.

Only numbers of graphics to be displayed are stored into the graphic buffer 15. The graphic painter 8 includes the graphic buffers by the number equal to the number of backgrounds. Since the three backgrounds are to be displayed in the embodiment, the graphic buffer 15 is designed to have the first to third background graphic buffers 15a to 15c. The numbers of graphics are stored into respective graphic buffers 15a to 15c by means of the graphic analyzer 14 reading out the plane number P4.

The graphic analyzer 14 judges whether a graphic is to be displayed, based on X and Y coordinates illustrated in FIG. 11. Only graphics which are judged by the graphic analyzer 14 to be displayed are effective as input signals to be transmitted to the graphic buffer 15. The judgement is carried out to all graphics stored in the parameter RAM 12 in accordance with addresses having been stored in the parameter RAM 12.

Figure 14:
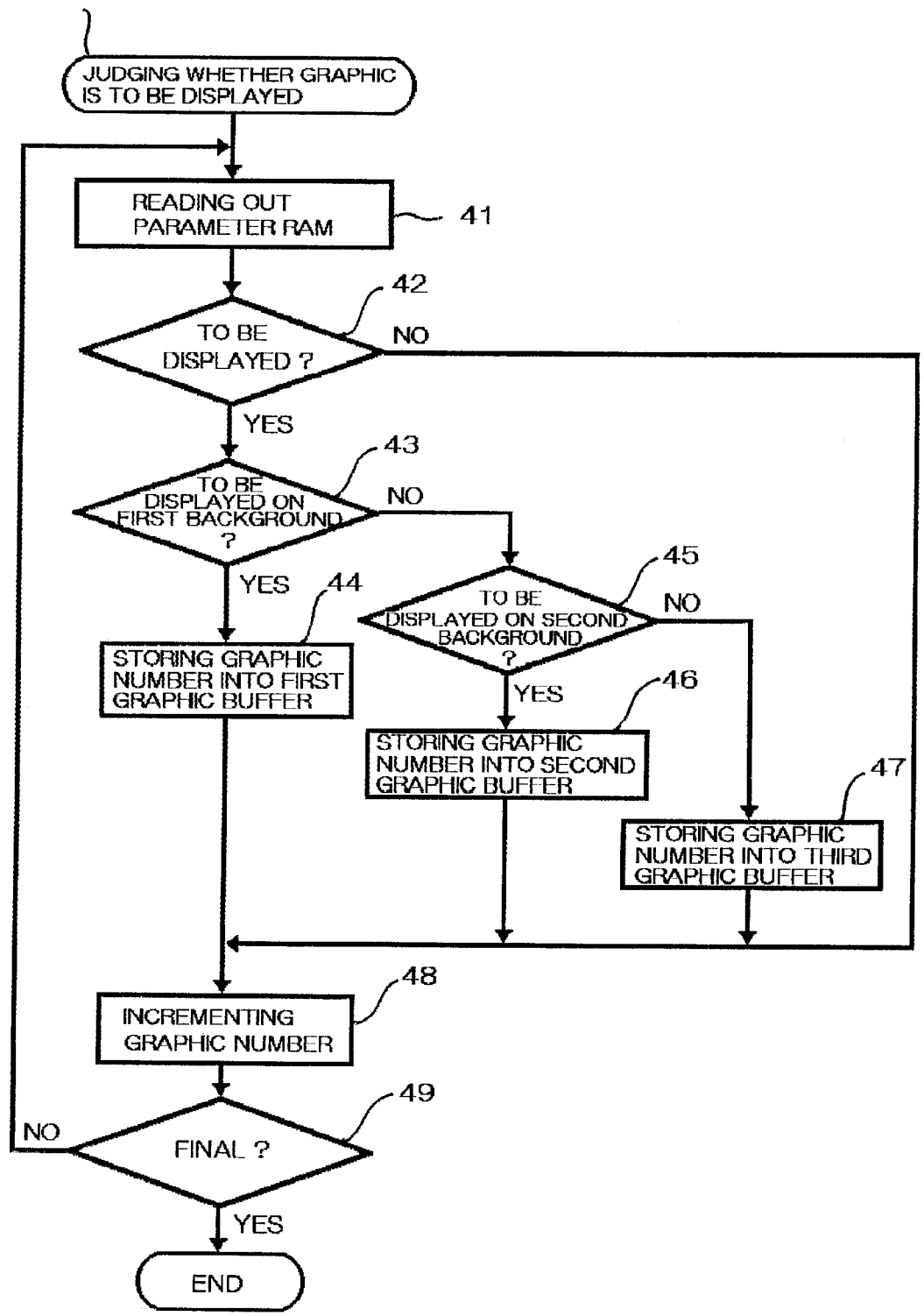
FIG. 14 is a flow chart of judgement as to whether graphic data is to be displayed.

Specifically, the step 33 is comprised of steps 41 to 49 illustrated in FIG. 14.

With reference to FIG. 14, the timing producer 17 of the graphic painter 8 transmits the graphic number ZB to the parameter RAM 12 as an address. On receipt of the graphic number ZB, the parameter RAM 12 extracts a parameter associated with a graphic having an address of the graphic number ZB, in step 41.

Then, a graphic associated with the thus extracted parameters is judged as to whether the graphic is to be displayed, in step 42. Then, if a graphic is to be displayed (YES in step 42), the graphic is then judged as to whether the graphic is to be displayed in the first background, in step 43, based on the extracted parameters, that is, X and Y coordinates.

If the graphic is to be displayed in the first background (YES in step 43), step 44 is carried out. Specifically, the graphic data which is judged effective as input signals to be transmitted to the graphic buffer 15 is checked with respect to the plane number thereof If the graphic data is judged to be displayed in the first background, the number of the graphic is stored into the first background graphic buffer 15a, in step 44.

If the graphic data is not to be displayed in the first background (NO in step 43), the graphic data is judged as to whether it is to be displayed in the second background, in step 45. Specifically, graphic data which is not to be stored into the first background graphic buffer 15a are further checked with respect to the plane number thereof If the graphic data is judged to be displayed in the second background (YES in step 45), the number of the graphic is stored into the second background graphic buffer 15b, in step 46.

If the graphic data is not to be displayed in the second background (NO in step 45), the number of the graphic data is stored into the third background buffer 15c, in step 47.

The graphics having been thus stored into the graphic buffer 15 are assigned a priority for being displayed, in an order at which the graphics have been stored into the graphic buffer 15.

Subsequently to the above-mentioned steps 44, 46 and 47, the graphic numbers are incremented in step 48.

If a graphic number is smaller than the final graphic number, the steps 41 to 48 are repeated. If a graphic number is greater than the final graphic number, judgement as to whether a graphic is to be displayed is finished, in step 49.

Referring back to FIG. 13, the graphics on the third background is stored in the display buffer 26 with colors being synthesized, in step 34.

The graphic painter 8 calculates respective display parameters, using the graphic number of a graphic to be displayed on the third background among graphic numbers stored in the graphic buffer 15, as an address to the parameter RAM 12, and transmits the graphic data signal S11 to the display buffer 26. At this stage, the graphic data signal S11 and data accumulated in the display buffer 26 have such structures as illustrated in FIG. 15.

The display buffer 26 takes data out thereof, based on addresses input thereinto. If it is judged that a graphic is not necessary to be translucence-processed, based on a translucence value of input data, the addresses are rewritten into the input data. If it is judged that a graphic is necessary to be translucence-processed, colors are synthesized in accordance with an input translucence value such that data stored in the display buffer 26 is located remoter from a display screen and data input is located closer to a display screen.

The above-mentioned step is repeated until graphic data to be displayed on the third background is all stored into the display buffer 26.

Then, RGB data about the second background is stored in the display buffer 26 in step 35. Specifically, the 2D graphic processor 2 makes an image of the second background to be located closer to a display screen than the first background.

The background painter 7 transmits the background data signal S10, based on a number of images to be made, and stores image data about the second background into the display buffer 26.

The display buffer 26 takes data out thereof, based on addresses input thereinto. If it is judged that a graphic is not necessary to be translucence-processed, based on a translucence value of input data, the addresses are rewritten into the input data. If it is judged that a graphic is necessary to be translucence-processed, colors are synthesized in accordance with an input translucence value such that data stored in the display buffer 26 is located remoter from a display screen and data input is located closer to a display screen.

In step 36, the graphic painter 8 calculates respective display parameters, using the graphic number of a graphic to be displayed on the second background among graphic numbers stored in the graphic buffer 15, as an address to the parameter RAM 12, and transmits the graphic data signal S11 to the display buffer 26.

The display buffer 26 takes data out thereof, based on addresses input thereinto. If it is judged that a graphic is not necessary to be translucence-processed, based on a translucence value of input data, the addresses are rewritten into the input data. If it is judged that a graphic is necessary to be translucence-processed, colors are synthesized in accordance with an input translucence value such that data stored in the display buffer 26 is located remoter from a display screen and data input is located closer to a display screen.

The above-mentioned step is repeated until graphic data to be displayed on the second background is all stored into the display buffer 26.

Then, RGB data about the first background is stored in the display buffer 26 in step 37. Specifically, the 2D graphic processor 2 makes an image of the first background to be located closest to a display screen.

The background painter 7 transmits the background data signal S10, based on a number of images to be made, and stores image data about the first background into the display buffer 26.

The display buffer 26 takes data out thereof, based on addresses input thereinto. If it is judged that a graphic is not necessary to be translucence-processed, based on a translucence value of input data, the addresses are rewritten into the input data. If it is judged that a graphic is necessary to be translucence-processed, colors are synthesized in accordance with an input translucence value such that data stored in the display buffer 26 is located remoter from a display screen and data input is located closer to a display screen.

In step 38, the graphic painter 8 calculates respective display parameters, using the graphic number of a graphic to be displayed on the first background among graphic numbers stored in the graphic buffer 15, as an address to the parameter RAM 12, and transmits the graphic data signal S11 to the display buffer 26.

The display buffer 26 takes data out thereof, based on addresses input thereinto. If it is judged that a graphic is not necessary to be translucence-processed, based on a translucence value of input data, the addresses are rewritten into the input data. If it is judged that a graphic is necessary to be translucence-processed, colors are synthesized in accordance with an input translucence value such that data stored in the display buffer 26 is located remoter from a display screen and data input is located closer to a display screen.

The above-mentioned step is repeated until graphic data to be displayed on the first background is all stored into the display buffer 26.

Thus, the steps of making images or graphics are finished.

Then, in step 39, the 2D graphics processor 2 displayed the thus made images on the display device 4.

Specifically, data is taken out of the display buffer 26 pixel by pixel in synchronization with the display device control signal S17 transmitted from the controller 10, and then, RGB data as the image signal S4 is transmitted to the display device 4.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-40193 filed on Feb. 18, 1999 including specification, claims, drawings and summary is incorporated herein by reference in its entirety.

What is claimed is:

1. An apparatus for displaying a two-dimensional image by synthesizing a background to a graphic in translucence, said apparatus comprising:

a single display buffer into which background data and graphic data both having been processed in translucence are stored, and into which RGB data is stored, said RGB data being produced by processing images in translucence such that said images are processed in order from a most distant image to a closest image.

2. An apparatus for displaying a two-dimensional image by synthesizing a background to a graphic in translucence, said apparatus comprising:

a display device in which two-dimensional images are displayed;

a single display buffer storing graphic data therein;

a plurality of graphic buffers comprising a number of graphic buffers which is equal to the number of backgrounds to be displayed; and a processor which stores data of backgrounds into said display buffer such that said data is stored in order from data located at a bottom to data located at a top as viewed from a display screen, and stores each of numbers of graphics into each of graphic buffers associated with a background to be displayed.

3. An apparatus for displaying a two-dimensional image by synthesizing a background to a graphic in translucence, said apparatus comprising:

a plurality of graphic buffers comprising a number of graphic buffers which is equal to the number of backgrounds to be displayed;

a single display buffer;

a first processor which identifies a background on which a graphic is to be displayed, and stores a graphic number of said graphic into a graphic buffer associated with the an identified background; and a second processor which processes both background data and graphic data associated with each of said backgrounds in translucence such that said backgrounds are processed in order from a most distant background to a closest background, and stores resultant RGB data into said display buffer.

4. The apparatus as set forth in claim 3, wherein if graphic data has been already stored in said display buffer, said second processor reads said graphic data out of said display buffer, processes both said background data and the read out graphic data in translucence, and stores resultant RGB data into said display buffer.

5. An apparatus for a displaying two-dimensional image by synthesizing a background to a graphic in translucence, said apparatus comprising:

a background painter which processes background data and transmits a signal accordingly;

a graphic painter including:

a plurality of graphic buffers comprising a number of graphic buffers equal to the number of backgrounds to be displayed;

a memory storing parameters of graphics to be displayed;

a graphic analyzer which determines whether a graphic associated with a given graphic number is within a displayable area, based on said parameters stored in said memory, and stores said graphic number into a graphic buffer associated with a background to which said graphic is to be synthesized; and an output device which outputs data about said graphic; and a color synthesizer including:

a display buffer storing therein graphics data to be displayed; and a processor which processes data in translucency such that said backgrounds are processed in order from a most distant background to a closest background, and stores the resultant into said display buffer.

6. The apparatus as set forth in claim 5, wherein said processor processes background data transmitted from said background painter, graphics data transmitted from said graphic painter, and image data transmitted from said display buffer.

7. The apparatus as set forth in claim 5, wherein said color synthesizer further includes a pallet random access memory storing image data therein.

8. The apparatus as set forth in claim 7, wherein said processor processes background data transmitted from said background painter, graphics data transmitted from said graphic painter, image data transmitted from said pallet random access memory, and image data transmitted from said display buffer.

9. A method of displaying a two-dimensional image by synthesizing a background to a graphic in translucence, said method comprising:

processing both background data and graphic data in translucence;

storing the processed background data and graphic data into a single display buffer;

processing images in translucence such that said images are processed in order from a most distant image to a closest image, to thereby produce RGB data;

storing said RGB data into said display buffer; and displaying images stored in said display buffer.

10. A method of displaying two-dimensional image by synthesizing a background to a graphic in translucence, said method comprising:

storing data of backgrounds into a single display buffer such that said data is stored in an order from data located at a bottom to data located at a top as viewed from a display screen;

storing each of numbers of graphics into each of graphic buffers associated with a background to be displayed; and displaying images in said display screen.

11. A method of displaying two-dimensional image by synthesizing a background to a graphic in translucence, said method comprising:

identifying a background on which a graphic is to be displayed;

storing a graphic number of said graphic into a graphic buffer associated with the an identified background;

processing both background data and graphic data associated with each of said backgrounds in translucence such that said backgrounds are processed in order from a most distant background to a closest background;

storing resultant RGB data into a single display buffer; and displaying images, based on said RGB data stored in said display buffer.

12. The method as set forth in claim 11, further comprising:

if graphic data has been already stored in said display buffer, reading said graphic data out of said display buffer;

processing both said background data and the thus read out graphic data in translucence; and storing resultant RGB data into said display buffer.

13. The apparatus according to claim 1, wherein said apparatus applies translucence processing to all graphics to be displayed.

14. The apparatus according to claim 1, wherein a background and a graphic are simultaneously processed in translucence, and then stored in said display buffer.

15. The apparatus according to claim 13, wherein said apparatus applies translucence processing to a background and a single graphic.

16. The apparatus according to claim 1, further comprising:

a plurality of graphic buffers for storing graphics.

17. The apparatus according to claim 16, wherein said graphics are assigned a priority for being displayed.

18. The apparatus according to claim 17, wherein said plurality of graphic buffers comprises a number of graphic buffers which is equal to the number of backgrounds to be displayed.

19. The apparatus according to claim 18, further comprising:

a processor which stores data of backgrounds into said display buffer such that said data is stored in order from data located at a bottom to data located at a top as viewed from a display screen, and stores each graphic into each graphic buffer associated with a background to be displayed.

* * * * *